(12) United States Patent
Perry et al.

(10) Patent No.: US 9,779,395 B2
(45) Date of Patent: Oct. 3, 2017

(54) SYSTEMS AND METHODS FOR IDENTIFYING TRANSACTION CAPABILITIES OF CASHIER

(71) Applicant: WalMart Stores, Inc., Bentonville, AR (US)

(72) Inventors: Dustin Perry, Rogers, AR (US); Zachariah Smith, Bentonville, AR (US); Daryl White, Joplin, MO (US); Grant Wade, Bentonville, AR (US)

(73) Assignee: Wal-Mart Stores, Inc., Bentonville, AR (US)

(*) Notice: Subject to any disclaimer, the term of this patent is extended or adjusted under 35 U.S.C. 154(b) by 169 days.

(21) Appl. No.: 14/711,161

(22) Filed: May 13, 2015

(65) Prior Publication Data

US 2015/0332242 A1 Nov. 19, 2015

Related U.S. Application Data

(60) Provisional application No. 61/992,694, filed on May 13, 2014.

(51) Int. Cl.
| | |
|---|---|
| *G06Q 20/20* | (2012.01) |
| *G07G 1/00* | (2006.01) |
| *G07G 1/12* | (2006.01) |
| *G06Q 30/06* | (2012.01) |
| *G07G 1/01* | (2006.01) |

(52) U.S. Cl.
CPC ......... *G06Q 20/202* (2013.01); *G06Q 20/206* (2013.01); *G06Q 30/0607* (2013.01); *G07G 1/0018* (2013.01); *G07G 1/0036* (2013.01); *G07G 1/01* (2013.01); *G07G 1/12* (2013.01)

(58) Field of Classification Search
CPC ......... G06F 17/60; G06Q 10/00; G06Q 20/00
USPC ....................................... 705/16, 18
See application file for complete search history.

(56) References Cited

U.S. PATENT DOCUMENTS

| | | | |
|---|---|---|---|
| 3,182,357 A | 5/1965 | Tuttle | |
| 4,583,619 A | 4/1986 | Fry | |
| 5,557,513 A | 9/1996 | Frey et al. | |
| 6,354,498 B1 | 3/2002 | Lutz | |
| RE41,717 E | 9/2010 | Dejaeger | |
| 8,355,992 B1* | 1/2013 | Haugh | G07G 3/006 705/64 |
| 2002/0169673 A1* | 11/2002 | Prorock | G06Q 20/20 705/16 |
| 2007/0124170 A1* | 5/2007 | Cabell | G06Q 20/206 705/2 |
| 2013/0245819 A1 | 9/2013 | Davenport et al. | |

FOREIGN PATENT DOCUMENTS

EP 2026305 A1 2/2009

* cited by examiner

*Primary Examiner* — Rokib Masud
(74) *Attorney, Agent, or Firm* — McCarter & English, LLP; David R. Burns (57) ABSTRACT

Exemplary embodiments are directed to determining an availability of a transaction capability of a point-of-sale terminal, and alerting a customer of an availability of the transaction capability. Login activity can be detected at a point-of-sale terminal. An availability of a transaction capability for the point-of-sale terminal can be determined based on data retrieved by the point-of-sale terminal in response to the login activity. A visual alert associated with the transaction capability of the point-of-sale terminal is controlled based on the availability of the transaction capability.

20 Claims, 7 Drawing Sheets

SYSTEMS AND METHODS FOR IDENTIFYING TRANSACTION CAPABILITIES OF CASHIER

RELATED APPLICATION

This application claims priority from U.S. Provisional Patent Application No. 61/992,694, filed on May 13, 2014, the entire contents of which are incorporated herein by reference in their entirety.

BACKGROUND

Customers often spend time waiting in line to check out at a store. Once their turn arrives, they sometimes experience more delay if they are attempting certain transactions that cannot be performed by the cashier at that checkout station. In this case, the cashier may have to wait for another cashier or a manager to help complete the transaction or the customer may even have to switch lines. Due to various state and federal laws, certain transactions may only be performed on certain days or by certain employees. However, stores often do not inform customers of these limitations on transactions at the checkout station.

SUMMARY

Exemplary embodiments of the present disclosure are directed to determining an availability of a transaction capability of a point of sale terminal, and alerting a customer of an availability of the transaction capability.

In one embodiment, a computer-implemented method for displaying a transaction capability associated with usage of a point-of-sale terminal is provided. The method includes detecting login activity at a point-of-sale (POS) terminal, determining an availability of a transaction capability for the POS terminal based on data programmatically retrieved by the POS terminal in response to the login activity, and controlling circuitry electrically coupled to the POS terminal based on the availability of the transaction capability to cause the circuitry to control a visual alert associated with the transaction capability of the POS terminal. The method also includes executing code by the POS terminal to query a database storing employee information including an attribute of an employee associated with the login activity, determining whether the attribute satisfies a specified criteria, and determining whether the transaction capability associated with the POS terminal is available based on whether the specified criteria is satisfied. The method may also include executing code by the POS terminal to query a database storing information including a specified criteria for determining whether the transaction capability is available, and determining whether the transaction capability associated with the POS terminal is available based on whether the specified criteria is satisfied. The method may also include accessing a database storing employee information to access data related to the login activity, and accessing a database storing store information to access data related to the login activity. The transaction capability of the POS terminal includes at least one of an ability to sell alcohol, ability to sell tobacco, ability to sell lottery ticket, ability to cash checks at the POS terminal, or ability to complete a transaction associated with restricted goods.

In another embodiment, causing the circuitry to control the visual alert includes causing the circuitry to at least one of energize a light source or de-energize the light source. Within the method, causing the circuitry to control the visual alert includes causing the circuitry to render the visual alert on a display device. The method further includes detecting logoff activity, and in response to detecting the logoff activity, controlling the circuitry to cease outputting the visual alert. Within the method, the login activity indicates a login to the POS terminal by an employee. Also within the method, determining the transaction capability associated with the POS terminal includes determining whether an attribute associated with at least one of a location of a store within which the POS terminal is disposed, a calendar day on which the login activity is detected, or a time of a day during which the POS terminal is utilized.

In another embodiment, a system for alerting a customer of a transaction capability of a point-of-sale system is provided. The system includes a point-of-sale (POS) system programmed to detect login activity and determine whether a transaction capability is available at the POS system in response to the login activity, and an alerting system electrically coupled to the POS system and configured to output a visual alert based on the availability of the transaction capability. The POS system may also be programmed to query a database storing employee information including an attribute of an employee associated with the login activity, determine whether the attribute satisfies a specified criteria, and determine whether the transaction capability associated with the POS system is available based on whether the specified criteria is satisfied. The POS system may also be programmed to query a database storing information including a specified criteria for determining whether the transaction capability is available and determine whether the transaction capability associated with the POS system is available based on whether the specified criteria is satisfied. The alerting system may include a lighting device and circuitry, the lighting device being energized or de-energized by the circuitry based on the availability of the transaction capability at the POS system. The alerting system includes a display monitor, an output of the display monitor being controlled based on the availability of the transaction capability at the POS system.

The POS system may communicate with a database storing at least one of employee information or store information to determine whether the transaction capability is available, where the database is stored on a store server. The transaction capability of the POS system may include at least one of an ability to sell alcohol, ability to sell tobacco, ability to sell lottery ticket, and ability to cash checks.

In yet another embodiment, a non-transitory computer readable medium storing instructions executable by a processing device is disclosed. Execution of the instructions causes the processing device to implement a method for alerting a consumer of a transaction capability of a point-of-sale system in a store comprising. The processing device detects login activity at a point-of-sale (POS) system in a store, determines a transaction capability associated with the POS system based on data retrieved by the POS system in response to the login activity, and generates an output to control a visual alert associated with the transaction capability of the POS system.

In another embodiment, a method for managing a checkout lane queue is provided. The method includes enabling a customer to choose an appropriate checkout lane based on one or more transactional needs of the customer by alerting the customer of an availability of one or more transaction capabilities of a checkout lane via a visual alert device.

In yet another embodiment, a system for managing a checkout lane queue is provided. The systems includes an alerting system configured to enable a customer to choose an appropriate checkout lane based on one or more transactional needs of the customer by alerting the customer of an availability of one or more transaction capabilities of a checkout lane via a visual alert device. A non-transitory computer readable medium storing instructions executable by a processing device is disclosed. Execution of the instructions causes the processing device to implement a method for managing a checkout lane queue is provided. The method includes enabling a customer to choose an appropriate checkout lane based on one or more transactional needs of the customer by alerting the customer of an availability of one or more transaction capabilities of a checkout lane via a visual alert device.

Any combination and/or permutations of embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF DRAWINGS

Some embodiments are illustrated by way of example in the accompanying drawings and should not be considered as a limitation of the invention.

DESCRIPTION OF EXEMPLARY EMBODIMENTS

Described in detail herein are systems and methods for determining transaction capabilities of a checkout station and alerting customers of an availability of the transaction capabilities. In exemplary embodiments, when an associate or employee (e.g., a cashier) logs into a point-of-sale (POS) terminal associated with a checkout station, an availability of a transaction capability is determined. Based on the availability of a transaction capability, a visual alert can be provided, e.g., by controlling a visual alert device. The availability of a transaction capability can be determined based on information associated with the login activity. This information can be obtained from one or more databases.

As a non-limiting example, when a cashier logs into a POS terminal, such as an electronic cash register system, a transaction capabilities system installed on the POS terminal obtains information, such as the cashier's age, from an employee database. Based on the information, it is determined that the transaction capability of selling a product (e.g., alcohol) or a service (e.g., money transfers) is available at the POS terminal. If the transaction capability is available, the POS terminal has the ability to checkout the product or service for a customer, and a visual alert, such as a sign representing product or service, is turned on. The sign alerts customers in the store that they can checkout alcohol at this particular checkout station. Thus, customers are aware of which checkout lanes are capable of performing a transaction for the product or service. In other words, the use of systems and methods described herein can assist with controlling queue time by directing traffic to appropriate lanes based on customer's transaction needs.

By providing an alert of transaction capabilities of a POS terminal, exemplary embodiments of the present disclosure reduce checkout delays and improve a customer's experience at a store. As described herein, the transaction capabilities can be related to local, state, and/or federal laws that specify which associates or employees can sell restricted products or services based on one or more attributes of the employees. For example, certain local, state and/or federal laws require a person selling alcohol to be at least 21 years old and the transaction capabilities systems and methods described herein can alert customers as to whether the cashier satisfies the age requirement to sell alcohol. Similarly, the transaction capabilities systems and methods described herein can be used to alert customers of a number of transaction capabilities, such as the ability to sell certain restrictive items based on local, state and/or federal laws, the ability to perform certain transactions, the ability to accept certain payments, and the like. The transaction capabilities of a POS terminal can be determined based on information related to the employee, and additionally, based on information related to the store, and day and time of the transaction. Furthermore, the transaction capabilities systems and methods can be used by all kinds of stations, counters, and departments of a store. The systems and methods described herein can help reduce wait time in a line for various transactions. Thus, the transaction capabilities systems and methods are beneficial to various organizations.

The following description is presented to enable any person skilled in the art to create and use a computer system configuration and related method and article of manufacture to determine availability of a transaction capability of a point-of-sale system, and alerting a customer of the availability of the transaction capability. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
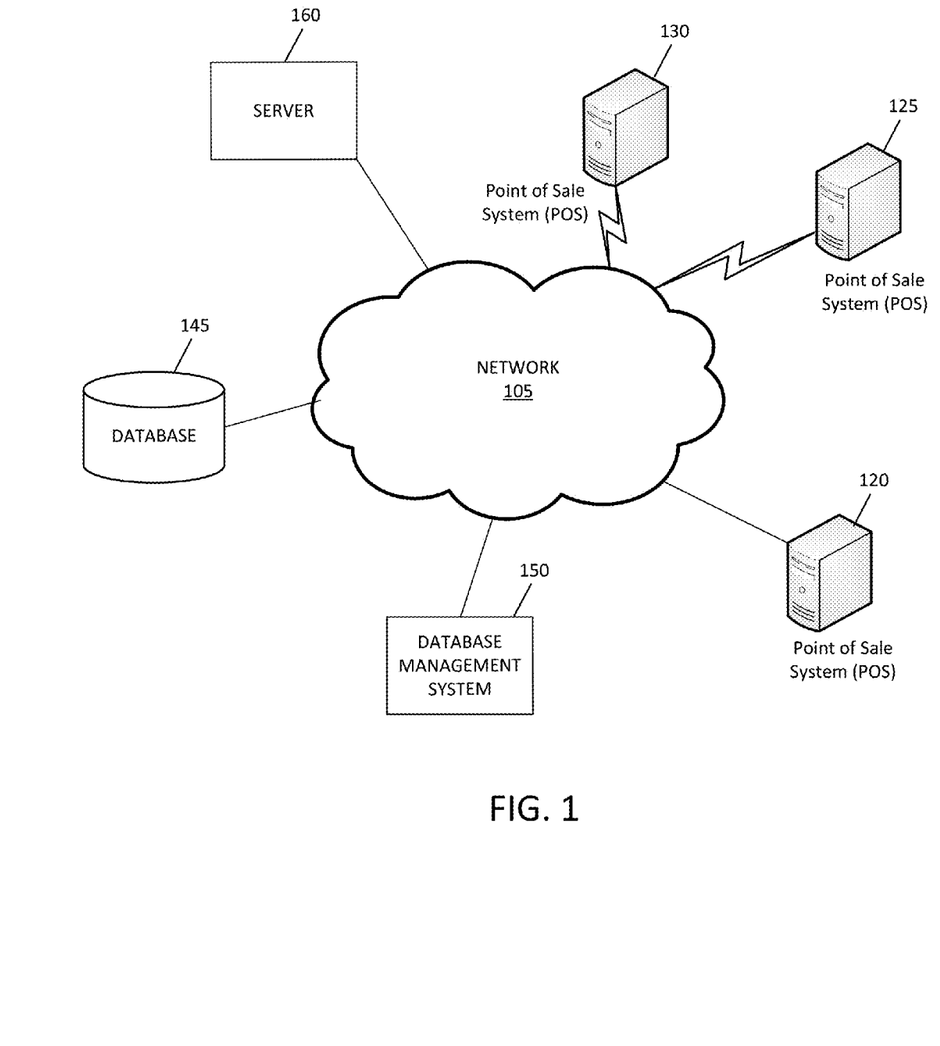
FIG. 1 illustrates a network diagram depicting a system for determining, and providing an alert related to, an availability of a transaction capability, according to an example embodiment.

FIG. 1 illustrates a network diagram depicting a transaction capabilities system 100 for determining which transaction capabilities are available at a POS terminal and conveying transaction capabilities information to a customer, according to an example embodiment. The system 100 can include a network 105, multiple client devices, for example, client device 120, client device 125, client device 130, a database 140, a server 160, and a database management system 150. Each of the client devices 120, 125, 130, databases 140, 145, server 160, and database server(s) 150 is in communication with the network 105.

In an example embodiment, one or more portions of network 105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client devices 120, 125, 130 are point-of-sale (POS) systems that are part of a store infrastructure and aid in performing various transactions related to sales and other aspects of a store. Being part of a store's infrastructure, the POS systems may be installed within the store or they may be installed or operational outside of the store. For example, the POS system may be a mobile device that a store employee can use outside of the store to perform transactions or other activities. Additionally, the POS system may be a kiosk installed outside the store. Similarly, the POS system may be a mobile device that can be used within the store, and is not physically installed or attached to one particular location within the store.

The client devices 120, 125, 130 may comprise, but are not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The client devices 120, 125, 130 being POS systems, may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

Each of client devices 120, 125, 130 may connect to network 105 via a wired or wireless connection. Each of client devices 120, 125, 130 may include one or more applications such as, but not limited to, a sales transaction application, an inventory application, a product search application, a transaction capabilities application, and the like. In an example embodiment, the client devices 120, 125, 130 may perform all the functionalities described herein.

In other embodiments, the transaction capabilities application may be included on the client device 120, 125, 130, and the server 160 performs the functionalities described herein. In yet another embodiment, the client devices 120, 125, 130 may perform some of the functionalities, and server 160 performs the other functionalities described herein. For example, client devices 120, 125, 130 may detect login activity and control the visual alert device based on an availability of a transaction capability, while server 160 may determine availability of a transaction capability based on data associated with the login activity.

Each of the databases 140, 145, database management system 150, and server 160 is connected to the network 105 via a wired connection. Alternatively, one or more of the databases 140, 145, database management system 150, and server 160 may be connected to the network 105 via a wireless connection. Although not shown, database management system 150 can be (directly) connected to databases 140, 145, or server 160 can be (directly) connected to the database management system 150 and/or databases 140, 145. Server 160 comprises one or more computers or processors configured to communicate with client devices 120, 125, 130 via network 105. Server 160 hosts one or more applications or websites accessed by client devices 120, 125, 130 and/or facilitates access to the content of databases 140, 145. Database management system 150 comprises one or more computers or processors configured to facilitate access to the content of databases 140, 145. Databases 140, 145 comprise one or more storage devices for storing data and/or instructions (or code) for use by server 160, database management system 150, and/or client devices 120, 125, 130. Databases 140, 145, server 160, and/or database management system 150 may be located at one or more geographically distributed locations from each other or from client devices 120, 125, 130. Alternatively, databases 140, 145 may be included within server 160 or database management system 150.

Figure 2:
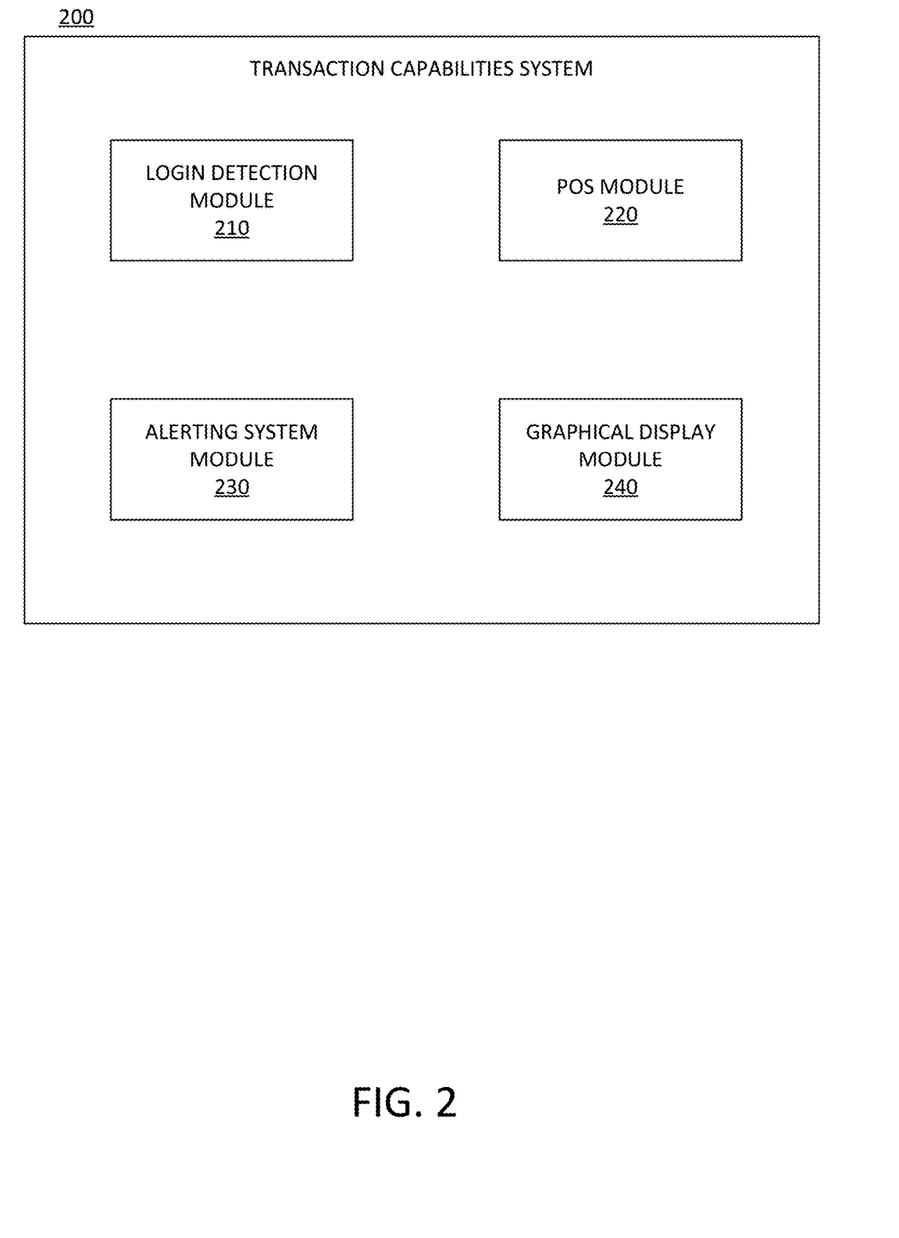
FIG. 2 is a block diagram showing a transactions capabilities system implemented in modules, according to an example embodiment.

FIG. 2 is a block diagram 200 showing a transactions capabilities system in terms of modules according to an example embodiment. The modules may be implemented in POS systems 120, 130, 140. The modules may include various circuits, circuitry and one or more software components, programs, applications, apps or other units of code base or instructions configured to be executed by one or more processors included in POS systems 120, 130, and/or 140. In other embodiments, one or more of modules 210-240 may be included in server 135 or database server(s) 140 while other of the modules 210-240 are provided in the POS systems 120, 130, 140. Although modules 210-240 are shown as distinct modules in FIG. 2, it should be understood that modules 210-240 may be implemented as fewer or more modules than illustrated. It should be understood that any of modules 210-240 may communicate with one or more components included in system 100, such as database(s) 130, server 135, database server(s) 140, or POS systems 120, 130, 140. The modules include a login detection module 210, POS module 220, an alerting system module 230, and a graphical display module 240.

The login detection 210 may be hardware-implemented module which may be configured to detect and manage login activity at a POS terminal at a checkout station. The login detection module 210 may extract or recognize data associated with the login activity, such as, a name associated with the login, an employee status (cashier, sales associate, manager, etc.) with the login, a time and day associated with the login, and the like. The login detection module 210 may also be configured to communicate with a database to determine data associated with the login activity. Based on the data associated with the login activity, the login detection module 210 may also determine whether a transaction capability is available at the POS terminal.

The POS module 220 may be a hardware-implemented module which may be configured to manage and operate a POS terminal. The POS module 220 may assist in general POS tasks, such as, scanning of items, recognizing price of items, totaling the price of items, receiving payment for items, and the like.

The alerting system module 230 may be a hardware-implemented module which may be configured to monitor and/or receive a signal from the POS terminal, and to control a visual alert device. The alerting system module 230 may receive a signal or notification from the POS terminal regarding availability of a transaction capability. In response to the notification, the alerting system module 230 controls a visual alert device. The visual alert device may indicate the availability of the transaction capability.

The graphical display module 240 may be a hardware-implemented module which may be configured to manage and display information on the POS terminal. In some embodiments, the visual alert device may be a monitor, such as a LCD monitor. In that case, the graphical display module 240 may also be configured to manage and display information on the visual alert monitor.

Figure 3:
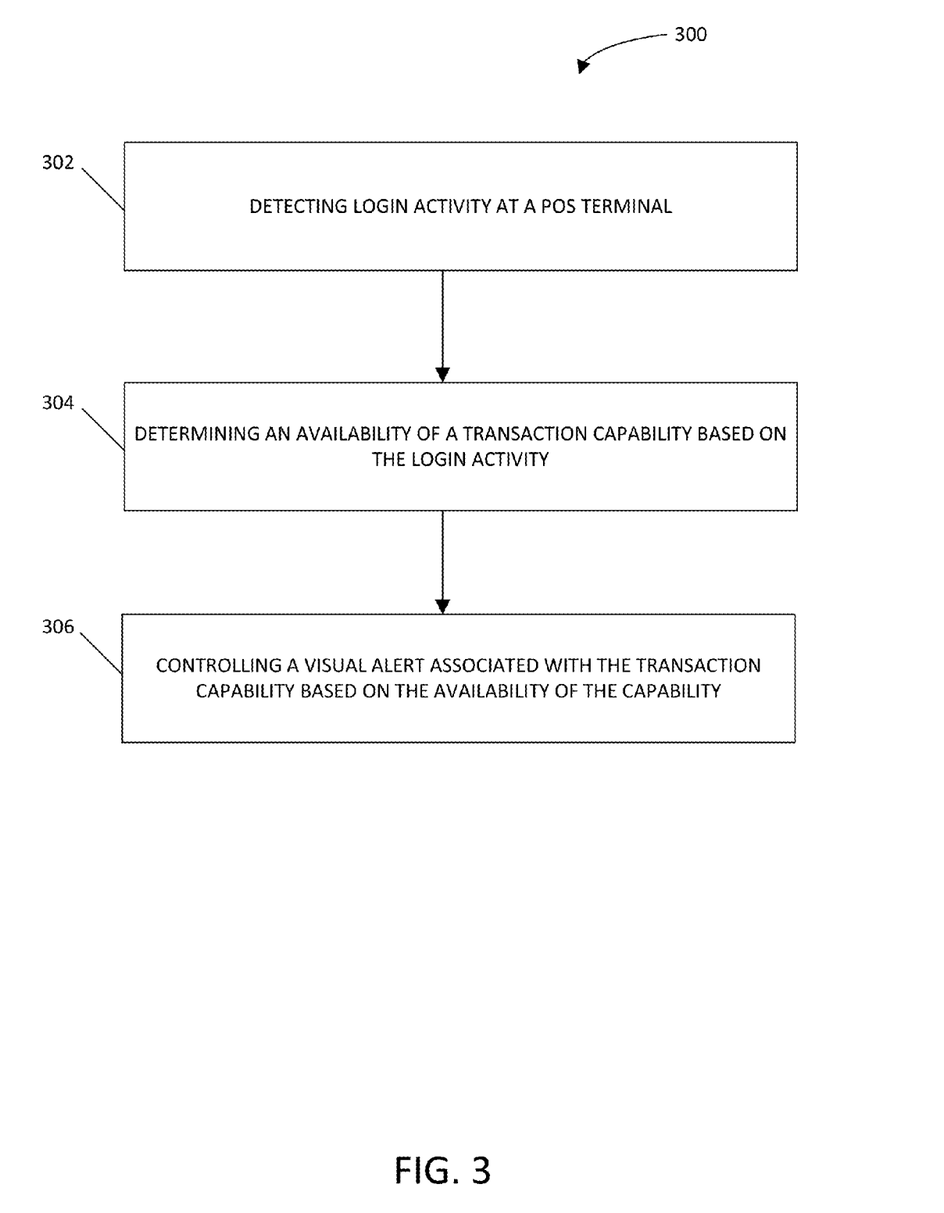
FIG. 3 is a flowchart showing an example method for alerting a customer of an availability of a transaction capability at a checkout station, according to an example embodiment.

FIG. 3 is a flow chart showing an example method 300 for alerting a customer of an availability of a transaction capability at a checkout station. The method 300 may be performed using the transaction capabilities system 200, as shown in FIG. 2.

In operation 302, the login detection module 210 detects a login activity at a POS terminal. When a store employee logs into a POS terminal with his or her credentials, the login detection module 210 recognizes the login. An employee may login using a login name and password unique to him, or by using an employee identification number assigned to him. Alternatively, an employee may login using his identification card, for example, by swiping or scanning it at the POS terminal. The employee may login at the start of his shift to access the POS terminal to perform his cashier duties. The employee may logout at the end of his shift. Logging out can prevent unauthorized use of the POS terminal. The login detection module 210 may also detect the logout activity. In some embodiments, an employee may login to the POS terminal to perform duties other than cashier duties. For example, a manager may login to access the cash drawer to count the money in the drawer, or to switch out the drawer, or to perform other audit-type duties. In some embodiments, the login detection module 210 may recognize that the employee is logging in for duties other than cashier duties, and method 300 may deviate from the steps shown in FIG. 3.

In operation 304, the login detection module 210 determines an availability of a transaction capability based on data from the login activity. The login detection module 210 may obtain data related to the login activity. In some embodiments, the login detection module 210 may communicate to a database located on the POS terminal to obtain data related to the login activity. In alternative embodiments, the login detection module 210 may communicate to a remote database located on a server. The server may be a store server that is accessible by various systems within the particular store, and the store server stores information related to the particular store. In other embodiments, the server may be a regional server that is accessible by a number of stores within a region, and the information on the regional server is not limited to information related to only one store.

The login detection module 210 obtains data from a database that indicates transaction capabilities of the employee associated with the login activity. The data may be related to the employee, such as the employee's name. The data may include information related to the employee's job title and/or duties, such as cashier, checkout clerk, store manager, sales associate, sales floor manager, and the like. In an example embodiment, the data includes information related to the employee's transaction capabilities, such as ability to sell certain items. For example, the database may include a data field associated with the employee that indicates the items the employee is capable of selling, or the transactions the employee is capable of performing, e.g., because information associated with the employee satisfies a specified criteria (e.g., a minimum age requirement). In this embodiment, the login detection module 210 is configured to obtain and use this data to determine the availability of a transaction capability. In an alternative embodiment, the data may include information related to the employee that helps determine the employee's transaction capabilities. For example, the data may include employee attributes, such as the employee's age, the employee's title or position (e.g., cashier, manager), and any training or certifications required (e.g., by law or by stores rules) to sell a product or service. Based on this information, the login detection module 210 may include logic to further analyze the data and determine the availability of a transaction capability. For example, the login detection module 210 can compare the information to specified criteria (e.g., a minimum age requirement), which if satisfied can indicate that a transaction capability is available at the POS terminal. The data may also include information related to the time and day the transaction is being performed.

In another example, the login detection module 210 obtains data from a database that includes information related to the store. For example, the data may include store attributes, such as information related to the store's geographic location, the store's capabilities based on its location, and the like. The store's capabilities may be dictated by local and state laws based on its geographic location. The capabilities may also be dictated by a particular time and day.

In yet another example, the login detection module 210 obtains data from a database that includes information related to the POS terminal. For example, the data may include information related to the POS terminal identifier such as a number, the POS terminal's location within the store, the department associated with the POS terminal, the transaction capabilities of the POS terminal, authorized employees for the POS terminal, login activity information at the POS terminal, and the like.

Certain stores, based on their geographic location, may require certain employees to perform certain transactions. For example, an employee must be of legal drinking age to be able to sell alcohol to a customer. Other examples of items that may have sales restrictions include tobacco, lottery tickets, firearms, fireworks, propane, certain medical drugs, and the like. Other examples of restrictive transactions may include cashing checks and money transfers. Some transactions may be restrictive based on the day or time. For example, in some locations a store cannot sell alcohol on a "dry day" such as Sunday, or sell alcohol after a certain time such as 10 pm. Such restrictions on transactions may be dictated by local, state, and federal laws.

Based on the data, such as employee age, employee status, day and time, etc., the login detection module 210 determines the availability of a transaction capability of the POS terminal in response to specified criteria. For example, if the data related to the login activity at the POS terminal indicates that the employee is at least 21 years old (e.g., a minimum age requirement), then the login detection module 210 determines that the capability to sell alcohol is available at the POS terminal (e.g., POS systems represented by client devices 120, 125, 130). Additionally, if it is after 10 pm (e.g., specified criteria for hours at which certain transaction capabilities are available), for example, then the login detection module 210 determines that the capability to sell alcohol is not available regardless of the age of the employee operation the POS terminal. Moreover, the login detection module 210 can determine the availability of multiple transaction capabilities at a POS terminal based on various data associated with login activity as well as specified criteria. For example, the employee at the POS terminal may be capable of selling alcohol, propane, and lottery tickets. After determining the availability of a transaction capability, the method 300 moves on to operation 306.

Figure 6:
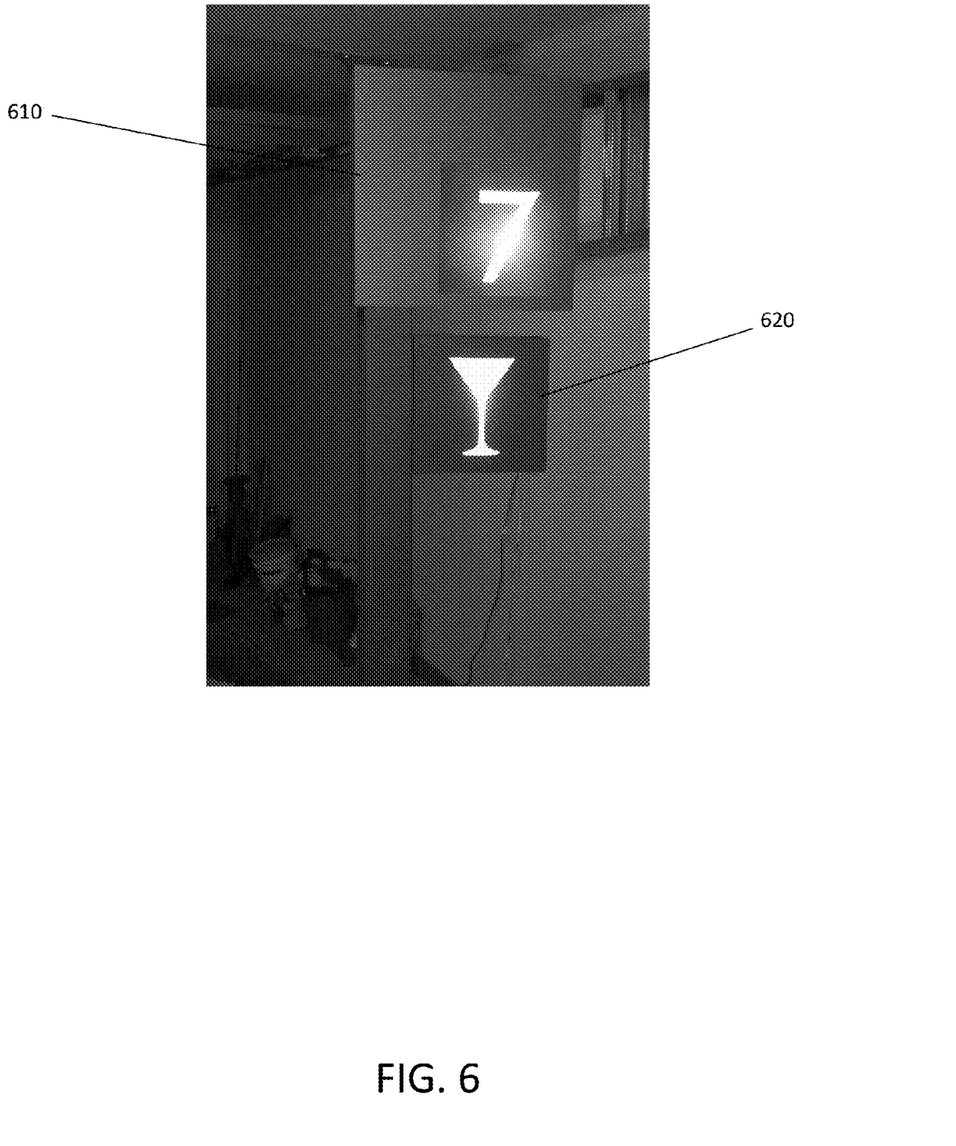
FIG. 6 is a diagram of an example visual alert device used in an alert system to provide an alert related to a transaction capability of a checkout station, according to an example embodiment.

In operation 306, the alerting system module 230 controls a visual alert associated with the transaction capability based on the availability of the capability. In an example embodiment, the alerting system module 230 may control a visual alert device by sending a signal to a control circuit to turn the visual alert device on or off based on the availability of the transaction capability. The alerting system module 230 may turn on the visual alert device if the POS terminal is capable of performing a transaction. The alerting system module 230 may turn off the visual alert device if the POS terminal is not capable of performing a transaction. In an example embodiment, the visual alert device can be a lighted sign indicating a transaction. For example, the lighted sign may include an LED light (or other illumination source) and a sign in the shape of a martini glass, as illustrated in FIG. 6. In this example, when the login detection module 210 determines that the POS terminal is capable of selling alcohol (e.g., the employees satisfies the age requirement and the day and time of the transaction satisfies the governing laws), the alerting system module 230 turns on the visual alert device, comprising a martini glass, to indicate to customers that the POS terminal is capable of selling alcohol. In addition to turning the sign on, the alerting system module 230 may also produce an audible sound indicating availability of a capability.

In another embodiment, the visual alert device is a monitor, such as a LCD monitor. In this example, the alerting system module 230 controls the monitor by enabling the monitor to display information related to the availability of a transaction capability. For example, if the POS terminal is capable of selling alcohol, the monitor may display text and/or graphics so indicating. Additionally, if the POS terminal is capable of selling propane and lottery tickets, then the monitor may display text and/or graphics so indicating. The graphics can include images or icons that graphically represent a transaction, such as a martini glass for alcohol or a propane tank for propane. The alerting system module 230 may also turn on the monitor, before displaying a visual alert, if a transaction capability is available. Alternatively, the login detection module 210 may turn on the monitor when it detects any login activity, even before determining the availability of a transaction capability. Upon detection of log out activity by the login detection module 210, the alerting system module 230 may turn off the visual alert device. Additionally, the alerting system module 230 may also produce an audible sound when the visual alert device is turned off.

In some example embodiments, the visual alert device may be coupled to a checkout lane number indicator. The checkout lane number indicator may be a lighted sign with a number, which indicates to a customer that the checkout lane is open. For example, as shown in FIG. 6, the checkout lane number 7 may have a sign with a 7 on it, and when the sign is on (the sign is lit) the checkout lane is available to checkout customers. When the sign with the 7 is off, the checkout lane is closed, and customers cannot use lane 7 for transactions.

In some embodiments, the login detection module 210 may turn on the checkout lane number sign upon detection of a login activity to indicate availability of the checkout lane associated with that number and POS terminal. The checkout lane number may be turned on before the login detection module 210 determines availability of a transaction capability. In other words, the checkout lane number sign is controlled independent of the visual alert device. Alternatively, the checkout lane number and the visual alert device can be controlled together. In other embodiments, the alerting system module 230 may control the checkout lane number sign, along with the visual alert device. In yet another embodiment, the checkout lane number sign may be manually controlled by an employee or associate at the store. In some example embodiments, the colors of the checkout number may be controlled to indicate transaction capabilities of the POS terminal (e.g., the color red can be used to represent alcohol can be purchased via the POS terminal).

Figure 4:
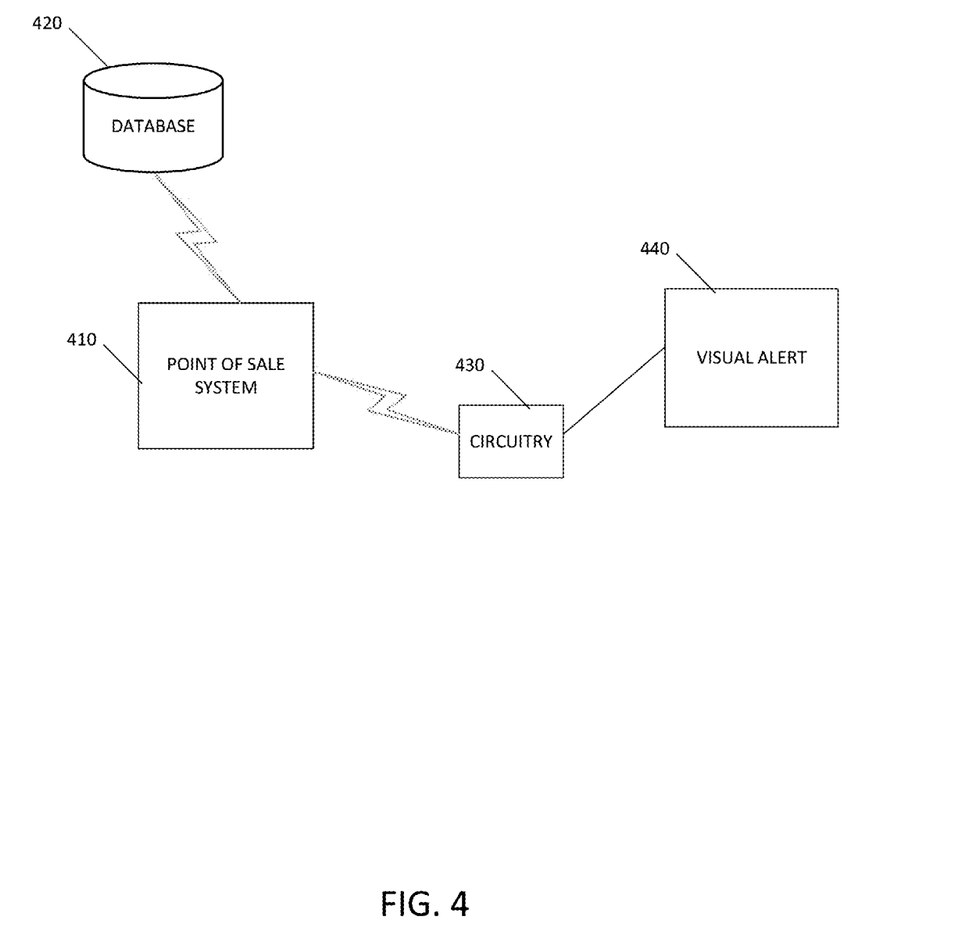
FIG. 4 is a diagram depicting an example system for an alert system related to a transaction capability of a checkout station, according to an example embodiment.

FIG. 4 is a diagram depicting an example system 400 for an alert system for a transaction capability of a checkout station. System 400 includes point of sale (POS) system 410 in communication with database 420 and circuit 430. Circuit 430 is operatively or electrically coupled to visual alert 440. POS system 410 can detect login activity and determine availability of various transaction capabilities, as discussed above. POS system 410 may communicate with database 420 via a communication network to obtain data related to the login activity, and based on the data, POS system 410 can determine the availability of transaction capabilities. As discussed above, database 420 may be a store database—only accessible by the store's system, or a regional database or enterprise database—accessible by other stores in the area or within the organization. In example system 400, database 420 is remotely located. However, in other embodiments, database 420 may be stored on POS system 410 itself. Based on the availability of a transaction capability, POS system 410 can send a signal to circuit 430. POS system 410 may communicate with circuit 430 via a network or Bluetooth communication network. In some embodiments, POS system 410 is electrically coupled to circuit 430, and sends an electrical signal to circuit 430. In response to receiving a signal from POS system 410, circuit 430 controls visual alert device 440. Visual alert device 440 may indicate to customers the availability of a transaction capability as discussed above. In some embodiments, POS system 410 directly controls the visual alert device 440, without using an intermediary circuit such as circuit 430.

Figure 5:
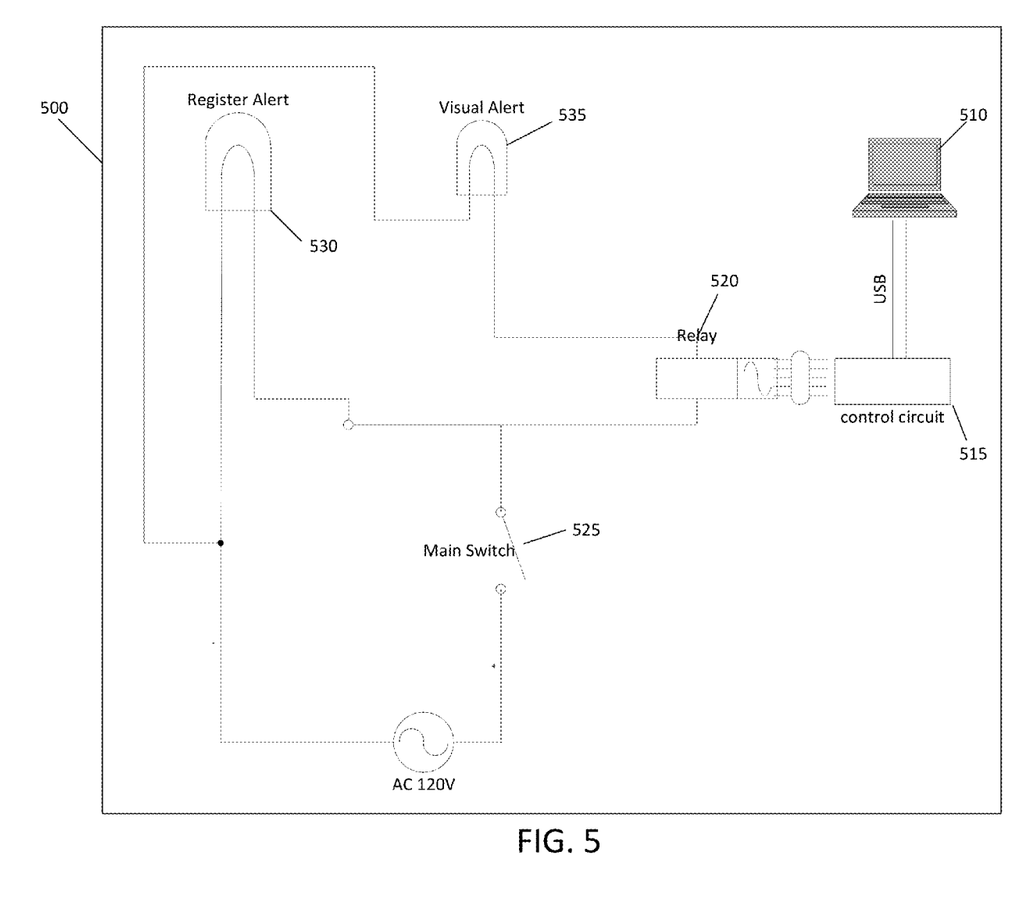
FIG. 5 is a schematic diagram of an example circuit used in an alert system related to a transaction capability of a checkout station, according to an example embodiment.

FIG. 5 is a schematic of an example circuit 500 used in an alert system for a transaction capability of a checkout station. Circuit 500 includes POS system 510 coupled to control circuit 515 via a USB connection. The control circuit 515 is a programmable controller with a central processing unit, and can include a processor or microcontroller and memory storing code or instructions and/or logic configured to determine when to activate and deactivate visual alert 535 in response to input signals received via the POS system 510. In this example, circuit 500 is configured so that register alert 530 is controlled manually by a user via a switch, while visual alert 535 is controlled by control circuit 515. Also, in this example, control circuit 515 activates or deactivates visual alert 535 only when register alert 530 is activated. The control circuit 515 may be an Arduino board, for example. The control circuit 515 is operatively coupled to relay switch 520. Relay switch 520 is electrically coupled to main switch 525, visual alert 535 and power supply (for example, AC 120V). Circuit 500 is configured to perform one or more functionalities described herein. POS system 510 sends a signal to control circuit 515 based on the availability of a transaction capability. The control circuit 515 controls visual alert 535 via relay switch 520. Visual alert 535 may be energized or de-energized based on the availability of a transaction capability. Register alert 530 may be a sign displaying the checkout lane number. In other embodiments, relay 520 can be replaced by any suitable switch that is electrically operated and is capable of performing the functionalities described herein.

FIG. 6 is a diagram of an example visual alert device 620 used in an alert system for a transaction capability of a checkout station. As discussed above, visual alert device 620 may be coupled to a checkout lane number 610. In this example, FIG. 6 illustrates visual alert device 620 as a martini glass light or sign. In other embodiment, the visual alert device 620 may be any kind of sign or signs that can indicate various transaction capabilities. In yet another embodiment, the visual alert device 620 may be a display monitor that can display text, images and icons indicating various transaction capabilities.

Although the transaction capabilities systems and methods are described as alerting a customer of a transaction capability of a checkout station or lane, one skilled in the art should appreciate that the transactions capabilities systems and methods can also be used by other types of stations, counters and/or departments within a store. Examples of such other stations, counters or departments include, but are not limited to, self-checkout lanes, pharmacy department, customer service department, financial services department (e.g., Walmart Money Center™), auto repairs and tires department, garden department, photo department, optical and eye glasses department, nail and beauty salon department, electronics department, jewelry department, items return department, pre-order pickup department, ship-to-store pickup department, meat and deli department, bakery department, florist department, gift-card center, coupon center, information desk, job application kiosk, curb-side loading center, and the like.

Examples of transaction capabilities include, but are not limited to, ability to restrictive items, ability to accept certain types of payment (e.g., cash, check, debit card, credit card, gift card, coupons, etc.), ability to accept government assistance programs (e.g., Supplemental Nutrition Assistance Program SNAP, food stamps, etc.), ability to perform certain services (e.g., cash checks, deposit checks, money transfers, help with carrying out bags, help with loading large items, answer questions, validate parking, etc.). Examples of restrictive items include, but are not limited to, alcohol, tobacco, propane, firearms, fireworks, lottery tickets, pharmaceutical drugs, and the like. Even though a few examples of transaction capabilities are discussed above, transaction capabilities can relate to any task or activity performed in a store by any number of employees.

In this manner, the systems and methods described herein determine a transaction capability of a checkout station and alert a customer of the availability of the transaction capability. The transaction capabilities systems and methods can reduce a customer's wait time in a checkout line by alerting the customer of the checkout lane's ability to perform certain transactions. By alerting the customer of the checkout lane's ability to perform, and indirectly alerting them of the inability to perform a transaction, a customer can decide which checkout lane is appropriate for his needs, and thus, can pick the correct lane to wait in. In this way, a customer can avoid delay resulting from waiting for an appropriate person to arrive at the checkout station to perform a transaction. In other words, the systems and methods described herein can assist in managing checkout lane queues by directing traffic to appropriate checkout lanes based on the customer's needs. In large stores, this delay can be significant, and alerting the customer of the transaction capabilities of the checkout lane can help in eliminating this delay.

Figure 7:
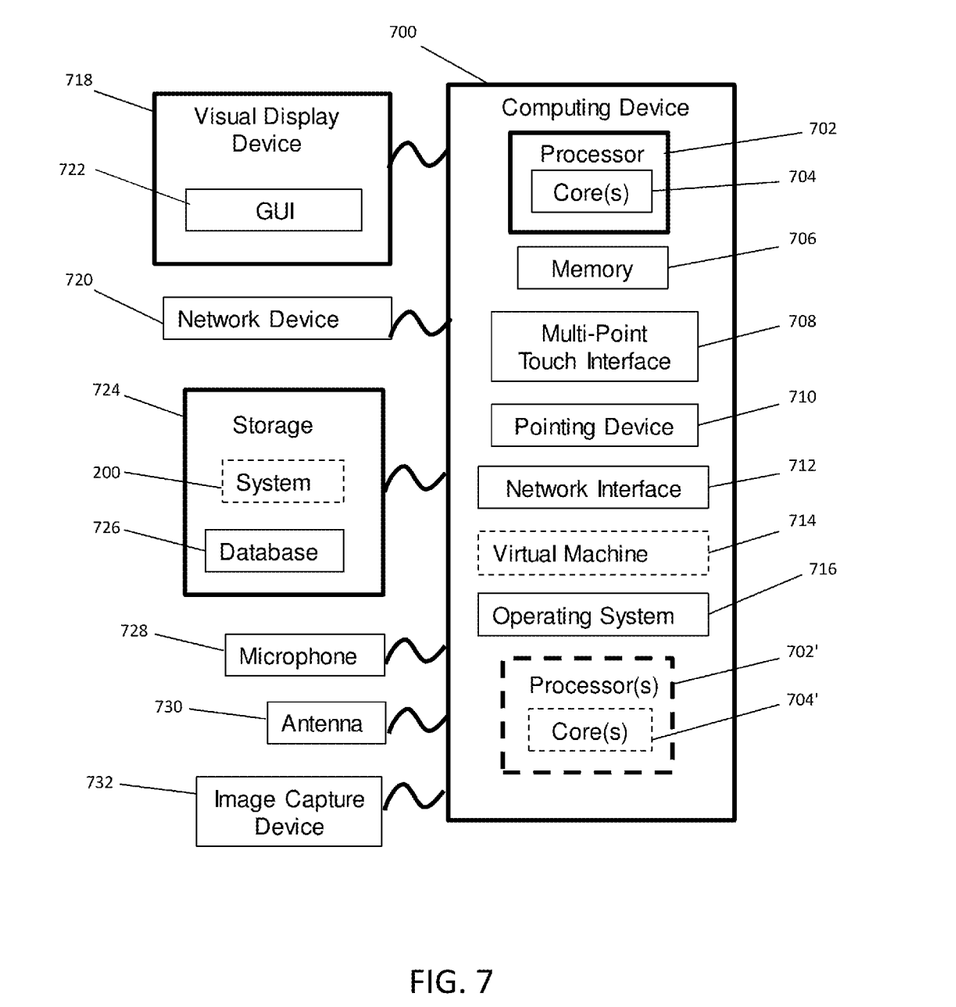
FIG. 7 is a block diagram of an exemplary computing device that may be used to implement exemplary embodiments of the transaction capabilities system described herein.

FIG. 7 is a block diagram of an exemplary computing device 700 that may be used to implement exemplary embodiments of the transaction capabilities system 200 described herein. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 706 included in the computing device 700 may store computer-readable and computer-executable instructions or software for implementing exemplary embodiments of the transaction capabilities system 200. The computing device 700 also includes configurable and/or programmable processor 702 and associated core 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' may each be a single core processor or multiple core (704 and 704') processor.

Virtualization may be employed in the computing device 700 so that infrastructure and resources in the computing device may be shared dynamically. A virtual machine 714 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 718, such as a computer monitor, which may display one or more graphical user interfaces 722 that may be provided in accordance with exemplary embodiments. The computing device 700 may include other I/O devices for receiving input from a user, for example, a keyboard or any suitable multi-point touch interface 708, a pointing device 710 (e.g., a mouse), a microphone 728, and/or an image capturing device 732 (e.g., a camera or scanner). The multi-point touch interface 708 (e.g., keyboard, pin pad, scanner, touch-screen, etc.) and the pointing device 710 (e.g., mouse, stylus pen, etc.) may be coupled to the visual display device 718. The computing device 700 may include other suitable conventional I/O peripherals.

The computing device 700 may also include one or more storage devices 724, such as a hard-drive, CD-ROM, or other computer readable media, for storing data and computer-readable instructions and/or software that implement exemplary embodiments of the transaction capabilities system 200 described herein. Exemplary storage device 724 may also store one or more databases for storing any suitable information required to implement exemplary embodiments. For example, exemplary storage device 724 can store one or more databases 726 for storing information, such employee name, employee identification number, employee age, employee title, employee status, employee duties information, employee login name, employee login password, employee authorized access information, store location, store number, item sale restrictions, relevant laws information, and/or any other information to be used by embodiments of the system 200. The databases may be updated manually or automatically at any suitable time to add, delete, and/or update one or more items in the databases.

The computing device 700 can include a network interface 712 configured to interface via one or more network devices 720 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 700 can include one or more antennas 730 to facilitate wireless communication (e.g., via the network interface) between the computing device 700 and a network. The network interface 712 may include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 700 may run any operating system 716, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 716 may be run in native mode or emulated mode. In an exemplary embodiment, the operating system 716 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A computer-implemented method for displaying a transaction capability associated with usage of a point-of-sale terminal, the method comprising:
    detecting login activity at a point-of-sale (POS) terminal;
    determining an availability of at least one transaction capability of a plurality of transaction capabilities for the POS terminal based on data programmatically retrieved by the POS terminal in response to the login activity;
    receiving, via circuitry including a controller electrically coupled to the POS terminal, a signal from the POS terminal indicating the availability of the at least one transaction capability; and
    controlling the circuitry based on the availability of the at least one transaction capability to cause the circuitry to control a visual alert device including one or more light sources, in response to receiving the signal,
    wherein the visual alert device is configured to illuminate one or more graphical representations via the one or more light sources based on availability of the plurality of transaction capabilities for the POS terminal, and
    wherein causing the circuitry to control the visual alert device comprises causing the circuitry to at least one of energize the one or more light sources or de-energize the one or more light sources associated with at least of the one or more graphical representations corresponding to the at least one transaction capability.

2. The method of claim 1, further comprising:
    executing code by the POS terminal to query a database storing employee information including an attribute of an employee associated with the login activity;
    determining whether the attribute satisfies a specified criteria; and
    determining whether the at least one transaction capability associated with the POS terminal is available based on whether the specified criteria is satisfied.

3. The method of claim 1, further comprising:
    executing code by the POS terminal to query a database storing information including a specified criteria for determining whether the at least one transaction capability is available; and determining whether the at least one transaction capability associated with the POS terminal is available based on whether the specified criteria is satisfied.

4. The method of claim 1, further comprising accessing a database storing employee information to access data related to the login activity.

5. The method of claim 1, further comprising accessing a database storing store information to access data related to the login activity.

6. The method of claim 1, wherein the at least one transaction capability of the POS terminal includes at least one of an ability to sell alcohol, ability to sell tobacco, ability to sell lottery ticket, ability to cash checks at the POS terminal, or ability to complete a transaction associated with restricted goods.

7. The method of claim 1, wherein causing the circuitry to control the visual alert device comprises causing the circuitry to render a visual alert on a display device.

8. The method of claim 1, further comprising detecting logoff activity, and in response to detecting the logoff activity, controlling the circuitry to de-energize the light source.

9. The method of claim 1, wherein the login activity indicates a login to the POS terminal by an employee.

10. The method of claim 1, wherein determining the at least one transaction capability associated with the POS terminal comprises determining whether an attribute associated with at least one of a location of a store within which the POS terminal is disposed, a calendar day on which the login activity is detected, or a time of a day during which the POS terminal is utilized.

11. A system for alerting a customer of a transaction capability of a point-of-sale system, the system comprising:
a point-of-sale (POS) system programmed to:
detect login activity and determine whether at least one transaction capability of a plurality of transaction capabilities is available at the POS system in response to the login activity; and
an alerting system electrically coupled to the POS system and configured to:
receive a signal from the POS system indicating availability of the at least one transaction capability;
control circuitry electrically coupled to the POS terminal based on the availability of the plurality of transaction capabilities to cause the circuitry to control a visual alert device including one or more light sources, in response to receiving the signal,
wherein the visual alert device is configured to illuminate one or more graphical representations via the one or more light sources based on the availability of the plurality of transaction capabilities for the POS terminal, and
wherein causing the circuitry to control the visual alert comprises causing the circuitry to at least one of energize the one or more light sources or de-energize the one or more light sources associated with at least one of the one or more graphical representations corresponding to the at least one transaction capability.

12. The system of claim 11, wherein the POS system is programmed to query a database storing employee information including an attribute of an employee associated with the login activity, determine whether the attribute satisfies a specified criteria, and determine whether the transaction capability associated with the POS system is available based on whether the specified criteria is satisfied.

13. The system of claim 11, wherein the POS system is programmed to query a database storing information including a specified criteria for determining whether the at least one transaction capability is available and determine whether the transaction capability associated with the POS system is available based on whether the specified criteria is satisfied.

14. The system of claim 11, wherein the alerting system includes a display monitor, an output of the display monitor being controlled based on the availability of the at least one transaction capability at the POS system.

15. The system of claim 11, wherein the POS system communicates with a database storing at least one of employee information or store information to determine whether the at least one transaction capability is available.

16. The system of claim 15, wherein the database is stored on a store server.

17. The system of claim 11, wherein the transaction capability of the POS system includes at least one of an ability to sell alcohol, ability to sell tobacco, ability to sell lottery ticket, and ability to cash checks.

18. A non-transitory computer readable medium storing instructions executable by a processing device, wherein execution of the instructions causes the processing device to implement a method for alerting a consumer of a transaction capability of a point-of-sale system in a store comprising:
detecting login activity at a point-of-sale (POS) system in a store;
determining at least one transaction capability of a plurality of transaction capabilities associated with the POS system based on data retrieved by the POS system in response to the login activity; and
receiving, via circuitry including a controller electrically coupled to the POS terminal, a signal from the POS system indicating availability of the at least one transaction capability;
controlling the circuitry based on the availability of the transaction capability to cause the circuitry to control a visual alert device including one or more light source, in response to receiving the signal,
wherein the visual alert device is configured to be illuminate one or more graphical representation via the one or more light sources, associated with the plurality of transaction capabilities of the POS terminal,
wherein causing the circuitry to control the visual alert comprises causing the circuitry to at least one of energize the one or more light sources or de-energize the one or more light sources associated with at least one of the one or more graphical representations corresponding to the at least one transaction capability.

19. The system in claim 11, wherein the alerting system comprises:
a controller electrically coupled to the POS terminal;
a first light source;
a second light source;
a first switch electrically coupled between a power source and the first light source;
a second switch electrically coupled between the first switch and the second light source, the second switch being controlled by the controller,
wherein, in response to activating the first light source, via the first switch, and receiving the signal by the controller from the POS terminal, the controller controls the second switch to activate the second light source.

20. The system of claim 19, wherein the activation of the second light source requires the first light source to be activated.

* * * * *